United States Patent
Wells et al.

(10) Patent No.: US 9,563,254 B2
(45) Date of Patent: Feb. 7, 2017

(54) SYSTEM, METHOD AND APPARATUS FOR ENERGY EFFICIENCY AND ENERGY CONSERVATION BY CONFIGURING POWER MANAGEMENT PARAMETERS DURING RUN TIME

(75) Inventors: Ryan D. Wells, Folsom, CA (US);
Sanjeev Jahagirdar, Folsom, CA (US);
Inder Sodhi, Folsom, CA (US);
Jeremy Shrall, Portland, OR (US);
Stephen H. Gunther, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 656 days.

(21) Appl. No.: 13/335,635

(22) Filed: Dec. 22, 2011

(65) Prior Publication Data

US 2012/0216058 A1    Aug. 23, 2012

(51) Int. Cl.
*G06F 1/00* (2006.01)
*G06F 1/32* (2006.01)
*G06F 1/26* (2006.01)

(52) U.S. Cl.
CPC ............ *G06F 1/324* (2013.01); *G06F 1/3206* (2013.01); *G06F 1/26* (2013.01); *Y02B 60/1217* (2013.01)

(58) Field of Classification Search
CPC ................................ G06F 1/3203; G06F 1/26
USPC ........................................................ 713/322
See application file for complete search history.

(56) References Cited

U.S. PATENT DOCUMENTS

| | | | |
|---|---|---|---|
| 2005/0192788 A1* | 9/2005 | Hobson | G06F 1/3203 703/22 |
| 2009/0228222 A1* | 9/2009 | Fantoni | G01R 31/021 702/59 |
| 2010/0115304 A1* | 5/2010 | Finkelstein et al. | 713/320 |
| 2010/0153761 A1 | 6/2010 | Nishioka | |
| 2010/0281284 A1* | 11/2010 | Kasprzak et al. | 713/324 |
| 2011/0047396 A1* | 2/2011 | Kawamoto et al. | 713/322 |
| 2011/0153924 A1 | 6/2011 | Vash et al. | |
| 2011/0241628 A1 | 10/2011 | Chen | |

FOREIGN PATENT DOCUMENTS

| | | |
|---|---|---|
| CN | 101923383 A | 12/2010 |
| EP | 0676686 A2 | 10/1995 |
| KR | 20090084255 A | 8/2009 |
| TW | M412423 U | 9/2011 |

(Continued)

OTHER PUBLICATIONS

Office action and Search Report with English translation of Search Report from Chinese Patent Application No. 201280063842.0, mailed Nov. 18, 2015, 58 pages.

(Continued)

*Primary Examiner* — Jaweed A Abbaszadeh
*Assistant Examiner* — Austin Hicks
(74) *Attorney, Agent, or Firm* — Nicholson De Vos Webster & Elliott LLP

(57) ABSTRACT

According to one embodiment of the invention, an integrated circuit device at least one compute engine and a control unit. Coupled to the compute engine(s), the control unit is adapted to dynamically control an energy-efficient operating setting of at least one power management parameter for the integrated circuit device after execution of Basic Input/Output System (BIOS) has already completed.

17 Claims, 13 Drawing Sheets

(56) References Cited

FOREIGN PATENT DOCUMENTS

TW          201133228  A      10/2011

OTHER PUBLICATIONS

PCT/US2012/068270 Notification Concerning Transmittal of International Preliminary Report on Patentability, mailed Jul. 3, 2014, 7 pages.
PCT/US2012/068270 Notification of Transmittal of the International Search Report and the Written Opinion of the International Searching Authority, mailed Apr. 1, 2013, 5 pages.
Office action with English translation from Taiwan Patent Application No. 101147198, mailed Apr. 22, 2015, 24 pages.
P39205TW SR Aug. 7, 2014 Search Report from Taiwan Patent Application No. 101147198, mailed Aug. 7, 2014, 1 page.

* cited by examiner

FIG. 4B

| \ | MSR Address:601h<br>Access:Read/Write | | | |
|---|---|---|---|---|
| | Bit | Scope | Default | Description |
| 451 | 63:62 | - | - | Reserved |
| | 61:59 | Package | 011b | PSI3_CODE (R/W) PSI Code associated with current threshold specified in PSI3_THRESHOLD field. |
| | 58:52 | Package | 01h | PSI3_THRESHOLD (R/W) Current Threshold for PSI3_CODE specified in Amps |
| | 51:49 | Package | 010b | PS2_CODE (R/W) PSI Code associated with current threshold specified in PSI2_THRESHOLD field. |
| | 48:42 | Package | 05h | PSI2_THRESHOLD (R/W) Current Threshold for PSI2_CODE specified in Amps |
| 481 | 41:39 | Package | 001b | PSI1_CODE (R/W) PSI Code associated with current threshold specified in PS1_CURRENT field. |
| | 38:32 | Package | 14h | PSI1_CODE (R/W) Current threshold for PSI1_CODE specified in Amps |
| | 31 | Package | 0b | CURRENT_LIMIT_LOCK (RW/L) When set, locks bits 31:0 of this MSR from further writes until a reset. |
| 482 | 30:13 | - | - | Reserved |
| | 12:0 | Package | 0x380 | CURRENT_LIMIT (RW/L) Maximum instantaneous current allowed at any given time. The value is represented in 1/8 A increments.<br>Current Limit=[Value] * (1/8)<br>Note: System BIOS must program this field with the maximum current supported by the Voltage Regulator. |

| MSR Symbol: | PRIMARY_PLANE_LLR_CONFIG_CONTROL | | | 452 |
|---|---|---|---|---|
| MSR Address: | 0x603 | | | |

| Name | MSB:LSB | Default Value | MSR Mask | Access Type | Description |
|---|---|---|---|---|---|
| Lock | 31:31 | 0b | 0b | RW-KL | This bit will lock all settings in this register for writes. The Leakage load line value in 10/256 mOhm increments. Values range from 0 mOhm to 10 mOhm. |
| Static (Leakage) Load Line Impedance | 23:16 | 36h | 00h | RW-L | The default value of 36h corresponds to 2.1mOhm. The Idle load line value in 10/256 mOhm increments. Values range from 0 mOhm to 10 mOhm. |
| Idle Load Line Impedance | 15:8 | 36h | 00h | RW-L | The default value of 36h corresponds to 2.1mOhm. The Dynamic load line value in 10/256 mOhm increments. Values range from 0 mOhm to 10 mOhm. |
| Dynamic Load Line Impedance (Load_Line) | 7:0 | 36h | 00h | RW-L | The default value of 36h corresponds to 2.1mOhm. |

| Symbol |
|---|
| LOCK BIT |
| LEAK LOAD LINE R |
| IDLE LOAD LINE R |
| DYNAMIC LOAD LINE R |

| | MSR Address:194h<br>Access:Read/Write ||||
|---|---|---|---|---|
| | Bit | Scope | Default | Description |
| | 63:21 | - | - | Reserved |
| 453 | 20 | Package | 0 | OC_LOCK (RW/L) When this bit is set bits 20, 7:0 in this register and all bits in TURBO_RATIO MSR 1ADh are locked. A reset is required to unlock any of these fields.<br>Note: This bit is available only on Ivy Bridge processors with signature great than or equal to 000306A3h |
| 490 | 19:17 | Package | 000 | Number of overclocking bins supported (RO) This field indicates the maximum number of bins by which the part can be overclocked<br>000b-No overclocking support on the part<br>001b-1 bin overclocking supported<br>010b-2 bin overclocking supported<br>011b-3 bin overclocking supported<br>100b-4 bin overclocking supported<br>101b-5 bin overclocking supported<br>110b-6 bin overclocking supported<br>111b-Unlimited overclocking supported |
| | 16 | Package | 0 | FLEX_EN (R/O) Flex Ratio Enabled. When this bit is set it means that the value in the FLEX_RATIO will be used. If this bit is clear, then value in the FLEX_RATIO field is ignored. |
| 495 | 15:8 | Package | 0 | MAX_RATIO (R/W) Desired Flex ratio. When enabled, the value in this field will set the maximum non-turbo ratio available. If this value is greater than the maximum ratio set by hardware, this field is ignored. |
| | 7:0 | Package | 0 | Over Clocking Extra Voltage (R/W) Desired Voltage to be used for over clocking. The processor will use this value to extrapolate voltages for various Turbo frequencies when over clocking is enabled. The voltage value is specified in units of 1/256 Volts. |

SYSTEM, METHOD AND APPARATUS FOR ENERGY EFFICIENCY AND ENERGY CONSERVATION BY CONFIGURING POWER MANAGEMENT PARAMETERS DURING RUN TIME

FIELD

Embodiments of the invention pertain to energy efficiency and energy conservation in integrated circuits, as well as code to execute thereon, and in particular but not exclusively, to run time programmability of various power management parameters.

GENERAL BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, ultrabooks, tablets, mobile phones, processors, embedded systems, etc. become even more prevalent (from inclusion in the typical computer, automobiles, and televisions to biotechnology).

As general background, controlling power consumption in microprocessors and other integrated circuit devices has increased in importance, especially with the greater use of mobile devices. Some prior art techniques for managing processor power consumption have not adequately provided a dynamic scheme for setting various power management parameters relied upon by an integrated circuit device, such as a processor. The lack of a dynamic setting scheme for various power management parameters, other than the Thermal Design Power (TDP) parameter, not only lessens the actual power savings realized, but also restricts the ability of Original Equipment Manufacturers (OEMs) to design products that can temporarily operate outside specifications established by the processor manufacturer, such as Intel Corporation of Santa Clara, Calif.

BRIEF DESCRIPTION OF THE DRAWINGS

The invention may best be understood by referring to the following description and accompanying drawings that are used to illustrate embodiments of the invention.

FIGS. 4B-4D are illustrative embodiments of different software accessible registers adapted for storing different power management parameters.

DETAILED DESCRIPTION

Figure 1:
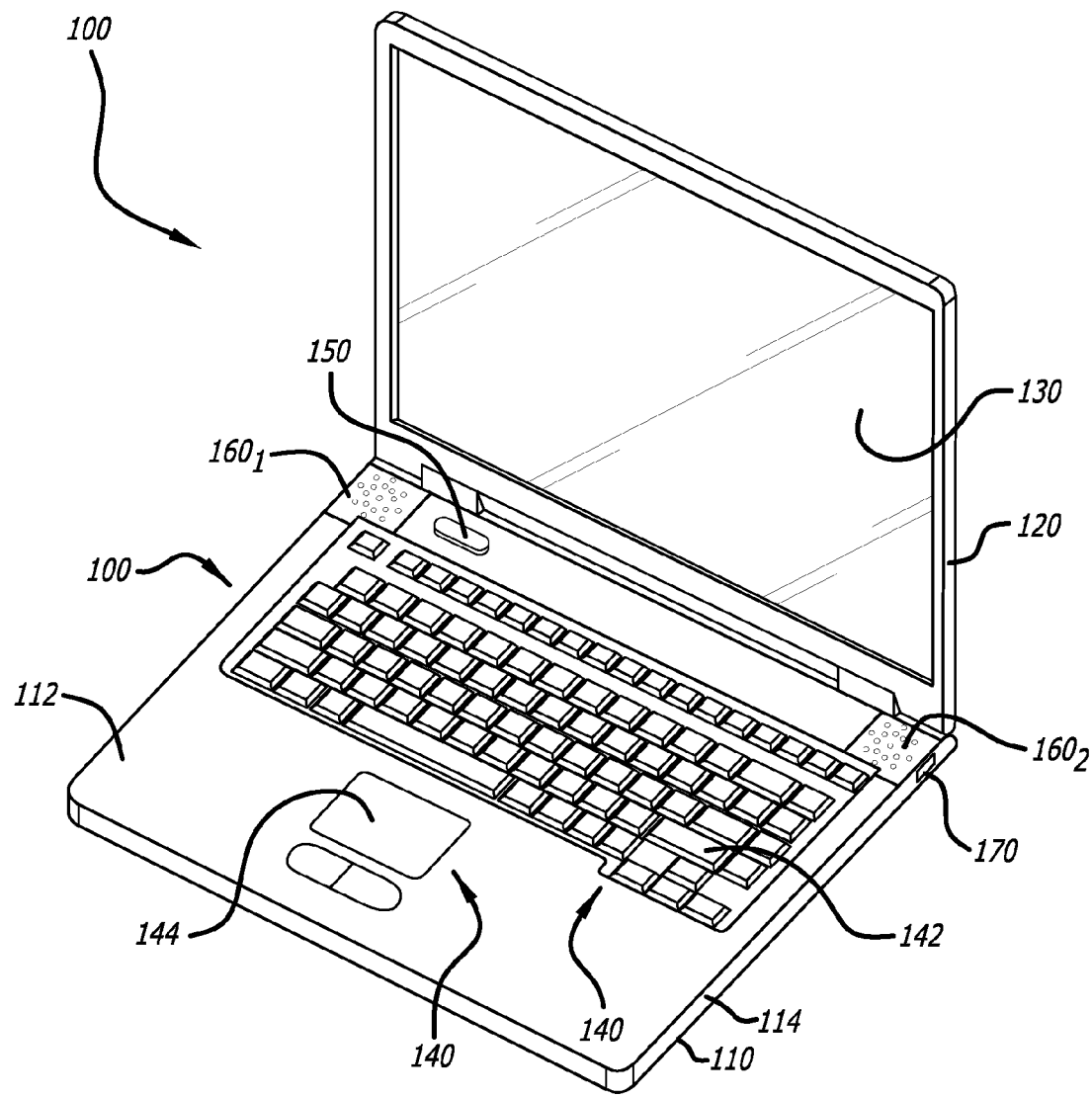
FIG. 1 is an exemplary block diagram of an electronic device implemented with an integrated circuit device with dynamic power management monitoring for performance adjustment.

Herein, certain embodiments of the invention relate to an integrated circuit device adapted to dynamically monitor and adjust parameters relied upon for power management during run time of an electronic device implemented with the integrated circuit, namely after Basic Input Output System (BIOS) has completed and the operating system (OS) is in control of the electronic device. These power management parameters may include, but are not limited or restricted to (1) a parameter ($Icc_{max}$) representing a maximum current level that can be used by the integrated circuit device in a certain operating mode, (2) a parameter accounting for dynamic changes in load line impedance (Load_Line) as detected by logic within the electronic device, and (3) a parameter (Max_Ratio) setting an overclocking condition optionally accompanied with an application of additional voltage. Through compliance with these dynamically adjustable power management parameters for a processor, for example, power conservation may be realized.

A corresponding method for dynamically adjusting power management parameters and an electronic device implementing such integrated circuit devices is also described herein.

In the following description, certain terminology is used to describe certain features of the invention. For example, the term "integrated circuit device" generally refers to any integrated circuit or collection of integrated circuits that are adapted to control its performance, and thus its power usage, using one or more power management parameters that are dynamically adjustable during run time. The power management parameters (e.g., maximum current level, maximum ratio for overclocking, etc.) are set through the use of storage elements that are software accessible, such as machine specific registers (MSRs) for example. For instance, the maximum current level may be set through the use of PP0_CURRENT_CONFIG and PP1_CURRENT_CONFIG registers described below. Examples of an integrated circuit device may include, but are not limited or restricted to a processor (e.g. a single or multi-core microprocessor, a digital signal processor "DSP", or any special-purpose processor such as a network processor, co-processor, graphics processor, embedded processor), a microcontroller, an application specific integrated circuit (ASIC), a memory controller, an input/output (I/O) controller, or the like.

Furthermore, the term "logic" constitutes hardware and/or software. As hardware, logic may include processing circuitry (e.g., a controller, processor, an application specific integrated circuit, etc.), semiconductor memory, combinatorial logic, or the like. As software, the logic may be one or more software modules, such as executable code in the form of an executable application, an application programming interface (API), a subroutine, a function, a procedure, an object method/implementation, an applet, a servlet, a routine, a source code, an object code, firmware, a shared library/dynamic load library, or one or more instructions.

It is contemplated that these software modules may be stored in any type of suitable non-transitory storage medium or transitory computer-readable transmission medium. Examples of non-transitory storage medium may include, but are not limited or restricted to a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive. Examples of transitory storage medium may include, but are not limited or restricted to electrical, optical, acoustical or other form of propagated signals such as carrier waves, infrared signals, and digital signals.

The term "interconnect" is broadly defined as a logical or physical communication path for information. This interconnect may be established using any communication medium such as a wired physical medium (e.g., a bus, one or more electrical wires, trace, cable, etc.) or a wireless medium (e.g., air in combination with wireless signaling technology).

Lastly, the terms "or" and "and/or" as used herein are to be interpreted as inclusive or meaning any one or any combination. Therefore, the phrases "A, B or C" and "A, B and/or C" mean any of the following: A; B; C; A and B; A and C; B and C; A, B and C. An exception to this definition will occur only when a combination of elements, functions, steps or acts are in some way inherently mutually exclusive.

I. System Architecture

Referring now to FIG. 1, an exemplary block diagram of an electronic device 100, which is implemented with one or more integrated circuit devices with run time adjustable power management parameters, is shown. Herein, electronic device 100 is realized, for example, as a notebook-type personal computer. However, it is contemplated that electronic device 100 may be a desktop computer, a television, a portable device, or an embedded application. Examples of a "portable device" may include, but is not limited or restricted to a cellular telephone, any portable computer including a tablet computer, an Internet Protocol (IP) device, a digital camera, a personal digital assistant (PDA), a video game console, a portable music player, or a digital camera. An example of an "embedded application" typically includes a microcontroller, a digital signal processor (DSP), a system-on-a-chip, network computers (NetPC), set-top boxes, network hubs, wide area network (WAN) switches, or any other system that can perform the functions and operations taught below.

As will become readily apparent in the description below, the embodiments of methods, electronic devices, and systems described herein (whether in reference to hardware, firmware, software, or a combination thereof) are vital to a 'green technology' future, such as for power conservation and energy efficiency in products that encompass a large portion of the US economy.

As shown in FIG. 1, electronic device 100 includes a housing 110 and a display unit 120. According to this embodiment of the invention, display unit 120 includes a liquid crystal display (LCD) 130 which is built into display unit 120. According to one embodiment of the invention, display unit 120 may be rotationally coupled to housing 110 so as to rotate between an open position where a top surface 112 of housing 110 is exposed, and a closed position where top surface 112 of housing 110 is covered. According to another embodiment of the invention, display unit 120 may be integrated into housing 110.

Referring still to FIG. 1, housing 110 may be configured as a box-shaped housing. According to one embodiment of the invention, an input device 140 is disposed on top surface 112 of housing 110. As shown, input device 140 may be implemented as a keyboard 142 and/or a touch pad 144. Although not shown, input device 140 may be touch-screen display 130 that is integrated into housing 110, or input device 140 may be a remote controller if electronic device 100 is a television.

Other features include a power button 150 for powering on/off electronic device and speakers $160_1$ and $160_2$ disposed on top surface 112 of housing 110. At a side surface 114 of housing 110 is provided a connector 170 for downloading or uploading information (and/or applying power). According to one embodiment, connector 170 is a Universal Serial Bus (USB) connector although another type of connector may be used.

As an optional feature, another side surface of electronic device 100 may be provided with high-definition multimedia interface (HDMI) terminal which support the HDMI standard, a DVI terminal or an RGB terminal (not shown). The HDMI terminal and DVI terminal are used in order to receive or output digital video signals with an external device.

Figure 2:
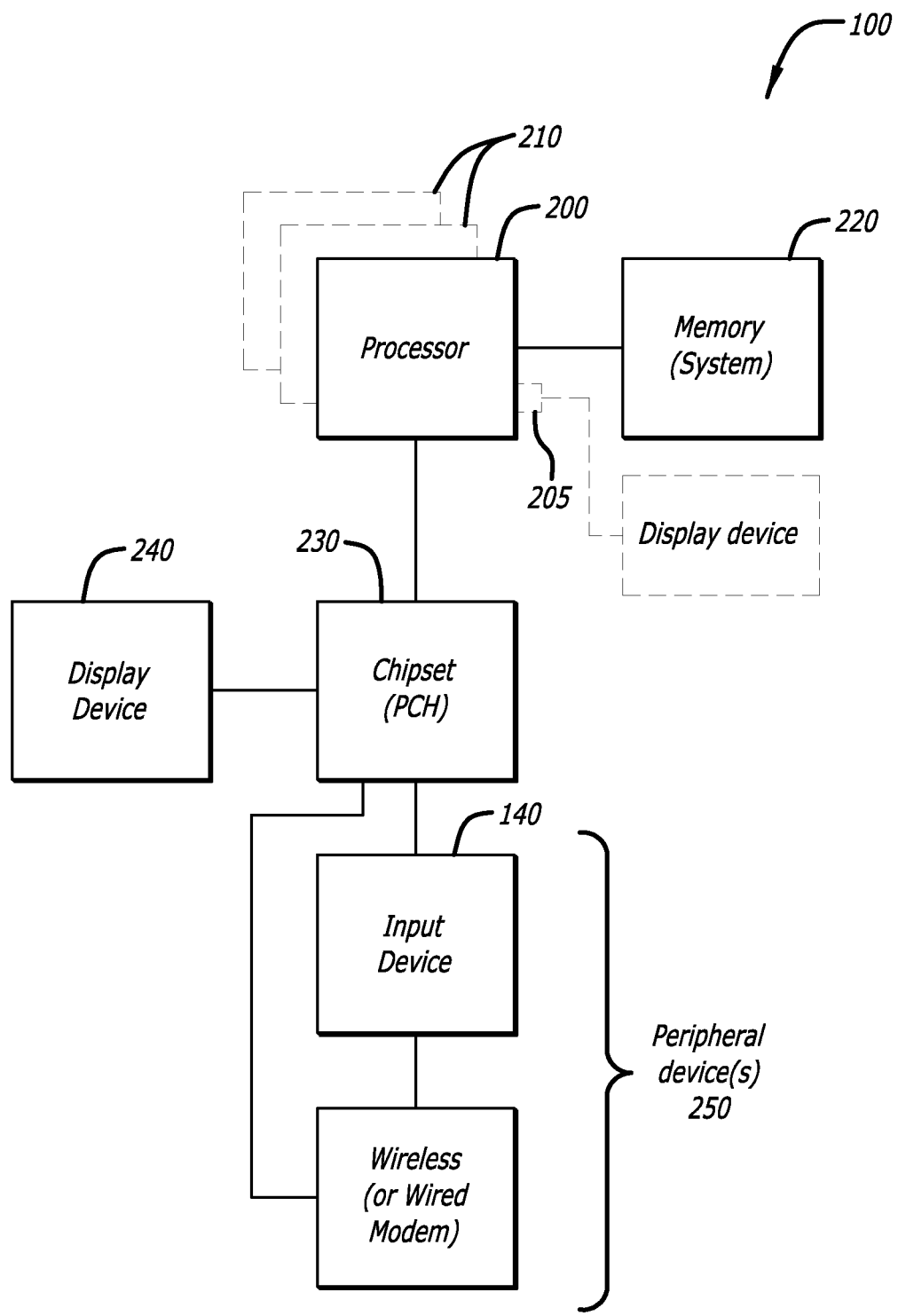
FIG. 2 is a first exemplary block diagram of the system architecture implemented within the electronic device of FIG. 1 or another electronic device.

Referring now to FIG. 2, a first exemplary block diagram of the system architecture implemented within electronic device 100 of FIG. 1 is shown. Herein, electronic device 100 comprises one or more processors 200 and 210. Processor 210 is shown in dashed lines as an optional feature as electronic device 100 may be adapted with a single processor as described below. Any additional processors, such as processor 210, may have the same or different architecture as processor 200 or may be an element with processing functionality such as an accelerator, field programmable gate array (FPGA), DSP or the like.

Herein, processor 200 comprises an integrated memory controller (not shown), and thus, is coupled to memory 220 (e.g., non-volatile or volatile memory such as a random access memory "RAM"). Furthermore, processor 200 is coupled to a chipset 230 (e.g., Platform Control Hub "PCH") which may be adapted to control interaction between processor(s) 200 and 210 and memory 220 and incorporates functionality for communicating with a display device 240 (e.g., integrated LCD) and peripheral devices 250 (e.g., input device 140 of FIG. 1, wired or wireless modem, etc.). Of course, it is contemplated that processor 200 may be adapted with a graphics controller (not shown) so that display device 240 may be coupled to processor 200 via a Peripheral Component Interconnect Express (PCI-e) port 205.

Figure 3:
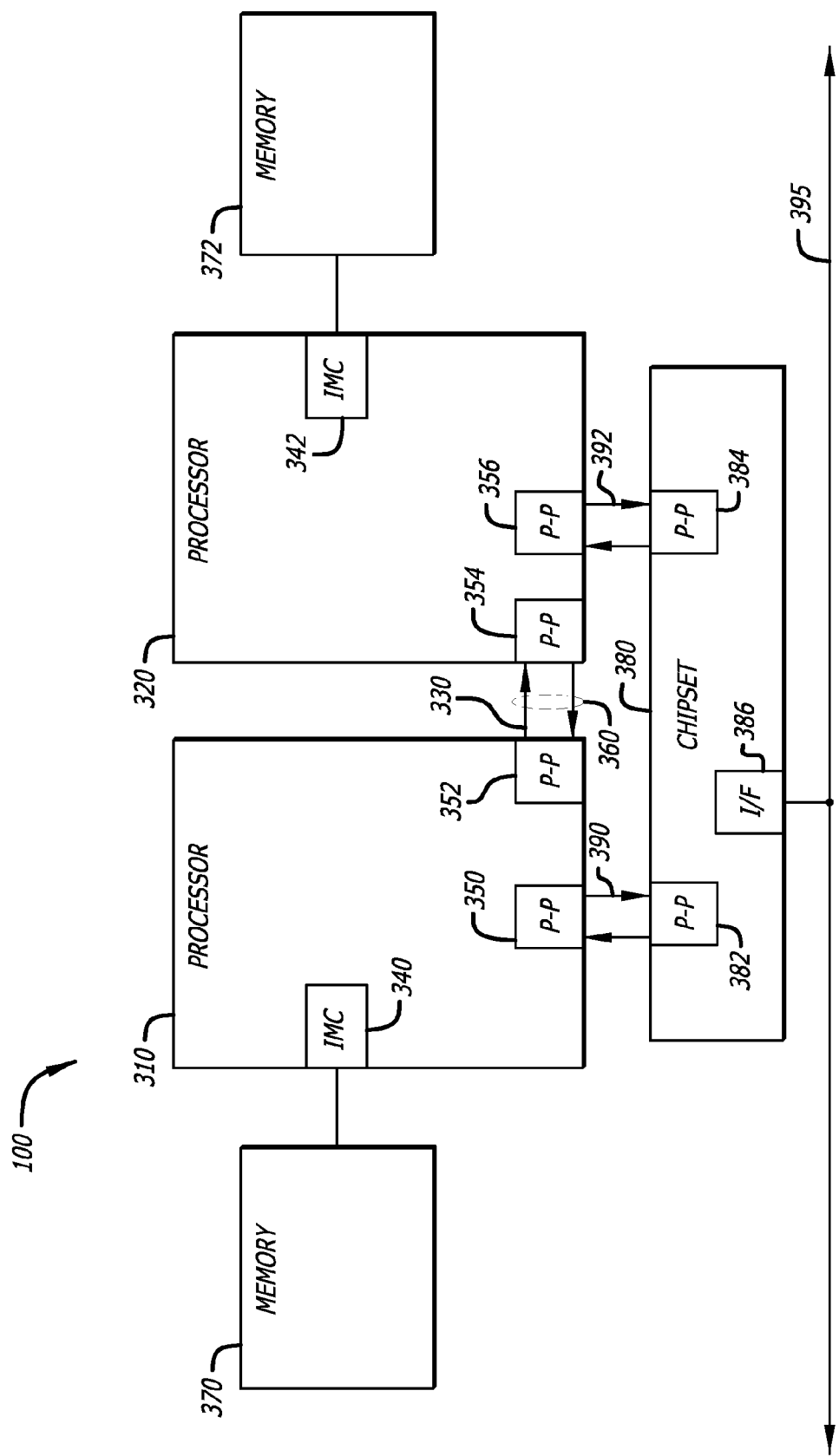
FIG. 3 is a second exemplary block diagram of the system architecture implemented within the electronic device of FIG. 1 or another electronic device.

Referring now to FIG. 3, a second exemplary block diagram of the system architecture implemented within electronic device 100 of FIG. 1 is shown. Herein, electronic system 100 is a point-to-point interconnect system, and includes first processor 310 and second processor 320 coupled via a point-to-point (P-P) interconnect 330. As shown, processors 310 and/or 320 may be some version of processors 200 and/or 210 of FIG. 2, or alternatively, processor 310 and/or 320 may be an element other than a processor such as an accelerator or FPGA.

First processor 310 may further include an integrated memory controller hub (IMC) 340 and P-P circuits 350 and 352. Similarly, second processor 320 may include an IMC 342 and P-P circuits 354 and 356. Processors 310 and 320 may exchange data via a point-to-point (P-P) interface 360 using P-P circuits 352 and 354. As further shown in FIG. 3, IMC 340 and IMC 342 couple processors 310 and 320 to their respective memories, namely memory 370 and memory 372, which may be portions of main memory locally attached to respective processors 310 and 320.

Processors 310 and 320 may each exchange data with a chipset 380 via interfaces 390 and 392 using P-P circuits 350, 382, 356 and 384. Chipset 380 may be coupled to a first bus 395 via an interface 386. In one embodiment, first bus 395 may be a Peripheral Component Interconnect Express (PCI-e) bus or another third generation I/O interconnect bus, although the scope of the present invention is not so limited.

Figure 4A:
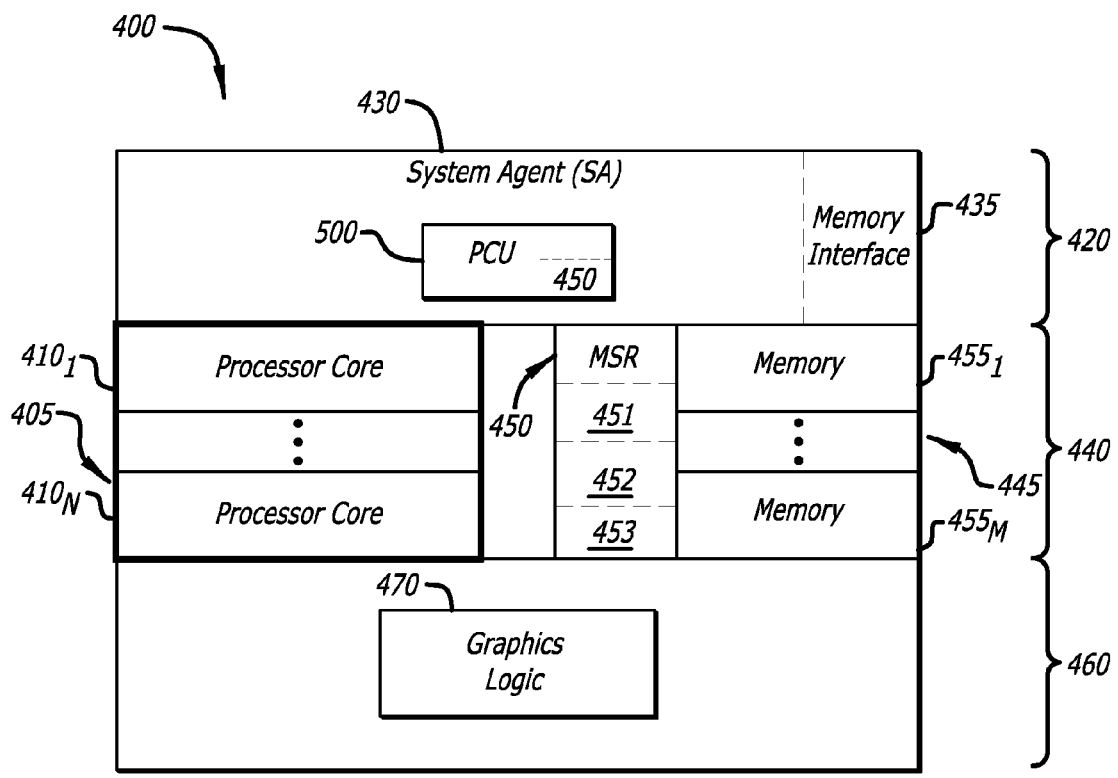
FIG. 4A is a first exemplary block diagram of the packaged integrated circuit device with current monitoring as a single-core or multi-core processor having an integrated graphics and system agent.

Referring to FIG. 4A, a first exemplary block diagram of an integrated circuit device 400 supporting a dynamic power management parameter adjustment scheme is shown. Herein, integrated circuit device 400 constitutes multi-core processor 200, which is partitioned to include a plurality of power planes 420, 440 and 460. Power plane 440 comprises a first compute engine 405 that includes multiple (N≥2) processor cores $410_1$-$410_N$. However, it is contemplated that first compute engine 405 may include a single processor core $410_1$ and/or elements with processing functionality other than a processor core.

Herein, a control unit 430, referred to herein the "system agent" (SA), is implemented on first power plane 420. System agent 430 is responsible for adjusting frequency and voltage applied to power planes 440 and 460. Moreover, system agent 430 is responsible for adjusting the power management parameters as described below.

As further shown in FIG. 4A, second power plane 440 includes processor cores $410_1$-$410_N$ and an on-chip memory architecture 445 coupled thereto. On-chip memory architecture 445 includes a plurality of software-accessible storage elements 450 (e.g., machine specific registers "MSRs") and a plurality of on-chip memories $455_1$-$455_N$ (M≥1). On-chip memories $455_1$-$455_N$ may be last-level caches (LLCs) each corresponding to one of the processor cores $410_1$-$410_N$ (M=N).

Herein, MSRs 450 are on-chip storage elements that are programmed to store values that represent limits, impedances, multipliers, or other information that is accessible by SA 430 for power management of integrated circuit device 400. MSRs 450 may be implemented on second power plane 440 as shown. However, it is contemplated that MSRs 450 may be implemented on power planes 420 or 460 such as part of a Power Control Unit (PCU) within SA 430.

As shown, a first MSR 451 may include a value ($Icc_{max}$) 480 that provides SA 430 with the maximum amount of instantaneous current for a particular power plane as shown in FIG. 4B. In particular, when CURRENT_LIMIT_LOCK bit 481 is not set, CURRENT_LIMIT bits 482 may be adjusted during run time to represent the maximum current limit that can be realized by processor 400 of FIG. 4A, which will adjust its operating conditions in order to meet the new limit. Such changes may be due to changes in the power delivery for the electronic device, such as the addition of another device (e.g., Universal Serial Bus "USB" or Firewire) which requires reallocation of device power delivery resources.

As shown in FIG. 4C, a second MSR 452 may include a value 485 that provides SA 430 with impedance for an interconnect (load line) between a power source (e.g., voltage regulator) and a compute engine (e.g. first compute engine 405). This value (Load_Line) 485 may dynamically change due to operational variations detected by electronic device 100. Examples of these variations may include, for example, a change in the power source (e.g. switch from an alternating current "AC" source to direct current "DC" source or vice versa), a change in operating state of electronic device 100 (e.g. from normal operating state to sleep state), a change in the number of active threads being processed, or the like. Load_Line 485, along with the known current being supplied are used by SA 430, namely firmware (P-code), is used to adjust the amount of voltage provided to second power plane 420 (and indirectly to compute engine 405) to offset a voltage drop caused by impedance from the interconnect between processor 400 and its power source. The impedance may be changed at runtime and the processor will adjust its operating conditions in order to comprehend the new value.

As shown in FIG. 4D, a third MSR 453 is adapted to store Max_Ratio 490, which provides PCU 500 (described below) with a maximum ratio used for overclocking. More specifically, when conditions are deemed satisfactory to exceed the guaranteed TDP frequency, Max_Ratio 490 is used as a new multiplier for a reference clock frequency to provide an increased clock frequency for at least one of processor cores $410_1$-$410_N$. As overclocking is the process of operating the compute engine at a higher clock rate (more clock cycles per second) than it was designed for or was specified by the manufacturer, third MSR 453 is further adapted to, by setting OVER_CLOCKING_EXTRA_VOLTAGE bits 495, signify an amount of extra voltage to be added in response to the increased operating frequency. Processor 400 updates its voltage and frequency tables in accordance with Max_Ratio 490.

Referring back to FIG. 4A, third power plane 460 includes a second compute engine, namely graphics logic 470. Control of third power plane 460 is the same as control of second plane 440. Third power plane 460 is controlled independently from second power plane 440. For instance, the $Icc_{max}$ for second power plane 440 may be different from $Icc_{max}$ for third power plane 460. Hence, MSRs 450 may include additional power management constraints for components implemented on different power planes.

In accordance with one embodiment of the invention, the adjustment of the power management parameters is managed by specific logic within system agent 430, namely a Power Control Unit (PCU) 500. A hybrid of hardware and firmware, PCU 500 is effectively a controller that manages all of the power management associated with integrated circuit device 400. Of course, in lieu of PCU 500, power management may be accomplished through an embedded controller within integrated circuit device 400, an off-die controller (e.g., controller within the same multi-chip package, on the same circuit board, etc.), or other types of logic.

II. Power Management of the Integrated Circuit Device

Figure 5:
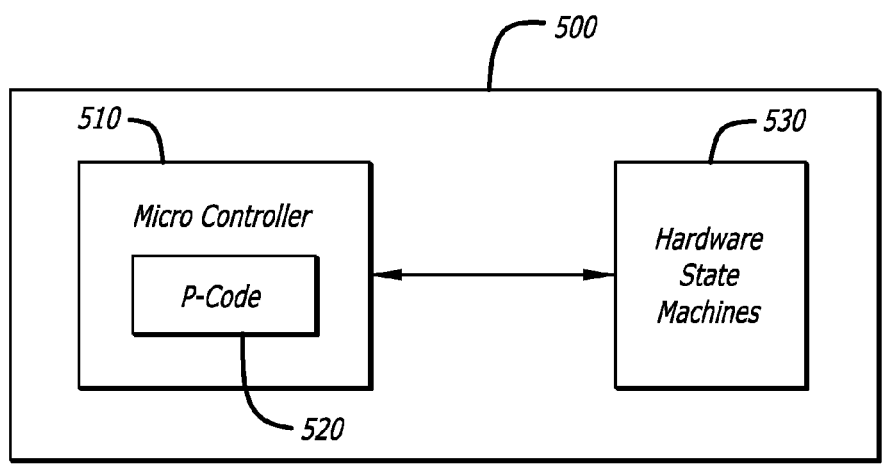
FIG. 5 is an exemplary block diagram of a Power Control Unit (PCU) implemented within the system agent unit of the processor of FIG. 4A.

Referring now to FIG. 5, one embodiment of system agent 430 features PCU 500 is shown. PCU 500 includes a micro-controller 510 that runs firmware 520 (P-code) for controlling the adjustment of various power management parameters in efforts to effect operations on the different power planes 440 and 460. In other words, according to one embodiment of the invention, P-code 520, when executed, is adapted to monitor operational components used for estimating and managing current usage and, where appropriate, permitting or precluding such current levels. This current adjustment effectively adjusts the operating frequency and power usage by one or more of processor cores $410_1$-$410_N$ implemented on power plane 440.

PCU 500 further includes hardware state machines 530 that control the transitioning in frequency (and voltage) for power planes 440 and 460.

According to one embodiment of the invention, as shown in FIGS. 4A and 5, each of processor cores $410_1$-$410_N$ is associated with assigned power parameters. Based on the current work level that is needed, PCU 500 is adapted to control processor cores $410_1$-$410_N$ and, based on the estimated current and predetermined current limits, allows or precludes such current usage. This effectively controls the operating frequency of processor cores $410_1$, . . . , and/or $410_N$. Such control is performed based on parameters as set forth in FIG. 6.

Figure 6:
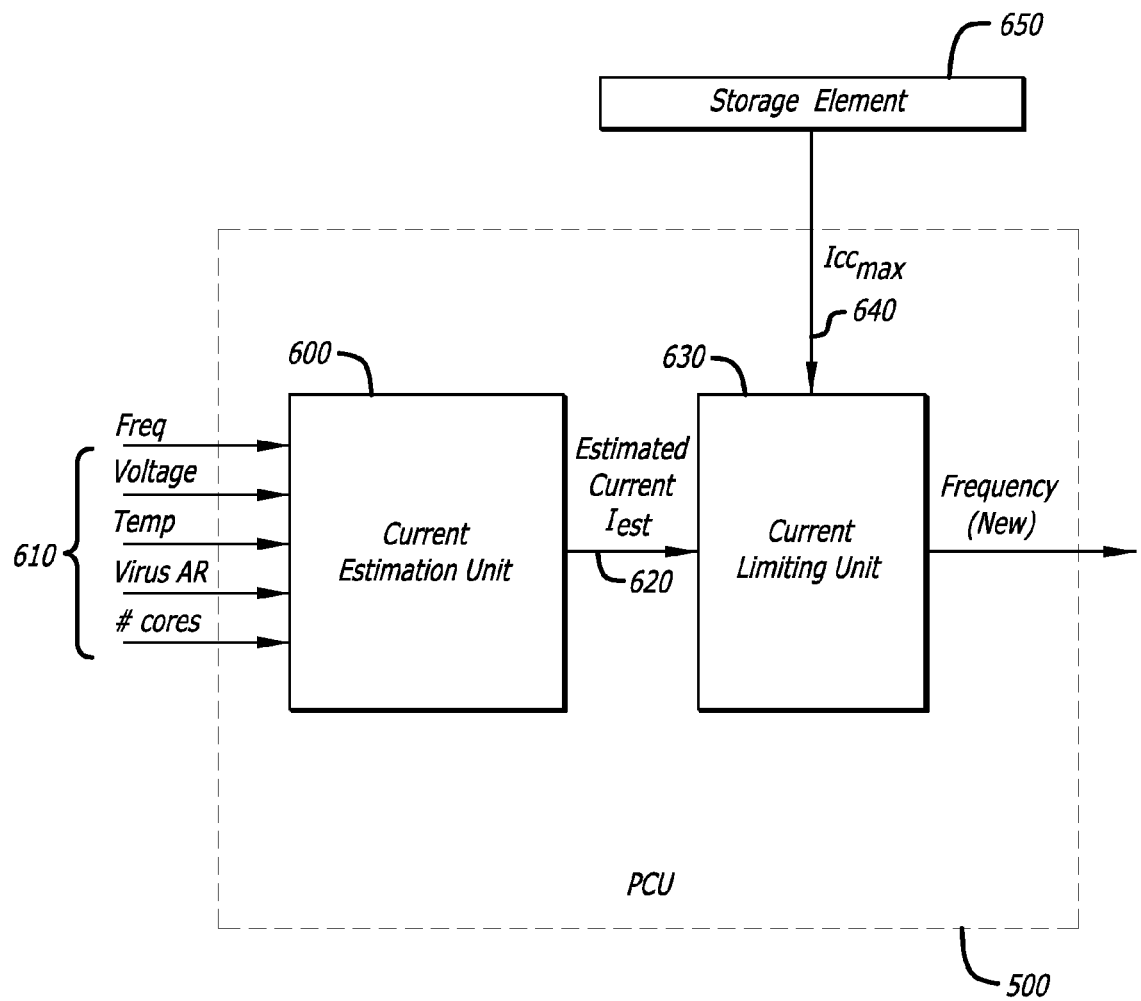
FIG. 6 is an exemplary embodiment of current estimation and computations to adjust the operating frequency of the processor of FIG. 4A in accordance with an embodiment of the invention.

Referring now to FIG. 6, an exemplary embodiment of current estimation and computations performed by PCU 500 of FIG. 5 in controlling performance of integrated circuit device 400 of FIG. 4A is shown. Herein, PCU 500 of FIGS. 4A and 5 may need to alter, during run time, maximum current usage based on operational variations detected by the electronic device. The need for such alteration may be determined, for example, by comparing a maximum current threshold to an estimated current computed using parameters. These parameters may include, but are not limited or restricted any or all of the following: frequency, voltage, temperature, power virus (e.g., 100% app ratio being the highest power level by integrated circuit device 400), the number of cores, reference leakage and/or leakage scaling.

More specifically, current estimation unit 600 of PCU 500 actively or passively monitors parameters 610 that are used to estimate an amount of current utilized by the integrated circuit device. For example, according to one embodiment of the invention, values as measured by sensors or contained within MSRs are input into current estimation unit 600.

According to this embodiment of the invention, as illustrated in FIG. 6, current estimation unit 600 performs an arithmetic operation on parameters 610 in order to produce estimated current ($I_{est}$) 620. Herein, the estimated current is computed by PCU 500, and in particular P-code 520, as a function of (i) frequency, (ii) voltage as a function of frequency, (iii) current temperature of the integrated circuit device, (iv) power virus, (v) number of processor cores within integrated circuit device 400, and perhaps reference leakage and leakage scaling parameters (not shown) or the like. Of course, it is contemplated that $I_{est}$ 620 may be computed by logic other than P-code 520 and provided as input to P-code 520.

Regardless, estimated current ($I_{est}$) 620 is input into a current limiting unit 630. Current limiting unit 630 is adapted to compare $I_{est}$ 620 to a current limit 640, which is accessible by P-code 520 from a MSR. As an illustrative example, a storage element 650 may be adapted to store a value that represents a maximum current. For instance, PP0_CURRENT_CONFIG MSR may be adapted to identify a maximum instantaneous current ($Icc_{max}$) for the power rail utilized by processor core(s) $410_1$, . . . , and/or $410_N$ within power plane 440. $Icc_{max}$ is represented by bits [12:0] of PP0_CURRENT_CONFIG MSR as shown in FIG. 4B. Similarly, another MSR (PP1_CURRENT_CONFIG) may be adapted to identify a maximum current ($Icc_{max}$) for the power rail utilized by graphics logic 470 within power plane 460.

Thereafter, during run time, Current Limiting unit 630 compares the estimated current to $Icc_{max}$ in order to determine if the estimated current is equal to or falls below $Icc_{max}$. If the estimated current is equal to or falls below $Icc_{max}$, then the proposed current usage is sustainable and the operating frequency corresponding to this current usage level is permitted. However, if the estimated current is greater than $Icc_{max}$, PCU 500 reduces the current, which reduces the operating frequency and corresponding voltage (P-State) of a particular compute engine, such as one of the processor cores $410_1$-$410_N$ of FIG. 4A. Of course, it is contemplated that such computations may be conducted based on average, median or worst case instantaneous current usage with short time window, or the like.

Figure 7:
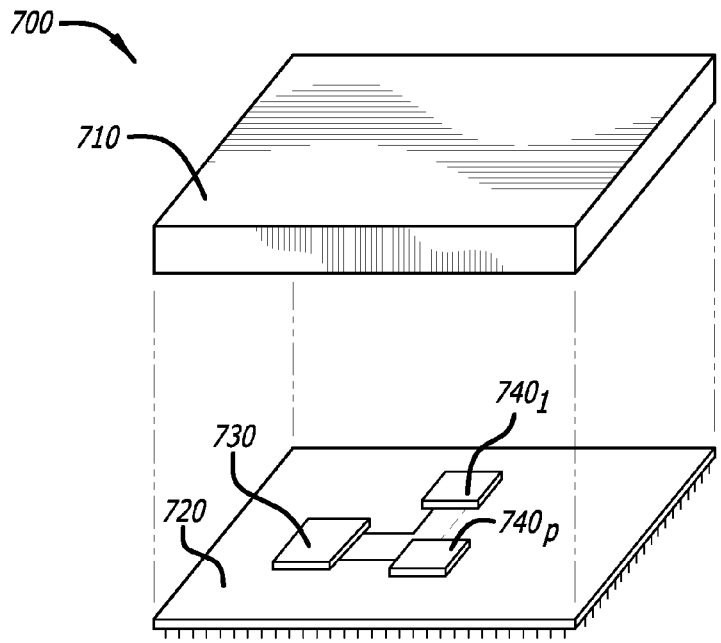
FIG. 7 is a second exemplary block diagram of the packaged integrated circuit device with activity monitoring as a packaged multi-processor unit with at least one of the processors supporting power management monitoring.

Referring now to FIG. 7, a second exemplary block diagram of an integrated circuit device 700 as a packaged multi-processor unit with at least one of the processors supporting a power management parameter adjustment scheme is shown. Herein, packaged integrated circuit device 700 includes a package 710 partially or fully encapsulating a substrate 720. Substrate 720 comprises a controller 730 that is adapted to monitor and limit current usage based on current constraints applicable to packaged integrated circuit device 700 and/or multiple integrated circuit devices $740_1$-$740_P$ (P≥2) on substrate 720. Hence, controller 730 performs the above-described operations of the PCU implemented in accordance with the integrated circuit (die) architecture shown in FIG. 4A.

Figure 8:
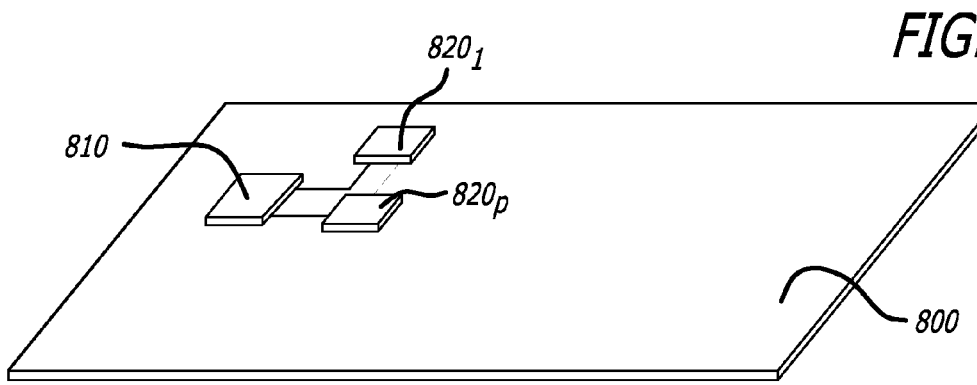
FIG. 8 is a third exemplary block diagram of the packaged integrated circuit device with power management monitoring implemented on a circuit board.

Referring now to FIG. 8, a third exemplary block diagram of the packaged integrated circuit device implemented on a circuit board 800 is shown. Herein, a packaged integrated circuit device 810 is mounted on circuit board 800 and is adapted as a controller for power management during run time. For instance, integrated circuit device 810 may be adapted to effectively monitor and limit currents applied to different portions of integrated circuit device 810 or other integrated circuit devices $820_1$-$820_P$ (P≥1) on circuit board 800. Hence, controller 810 performs the above-described operations of the PCU implemented in accordance with the integrated circuit (die) architecture shown in FIG. 4A.

Figure 9:
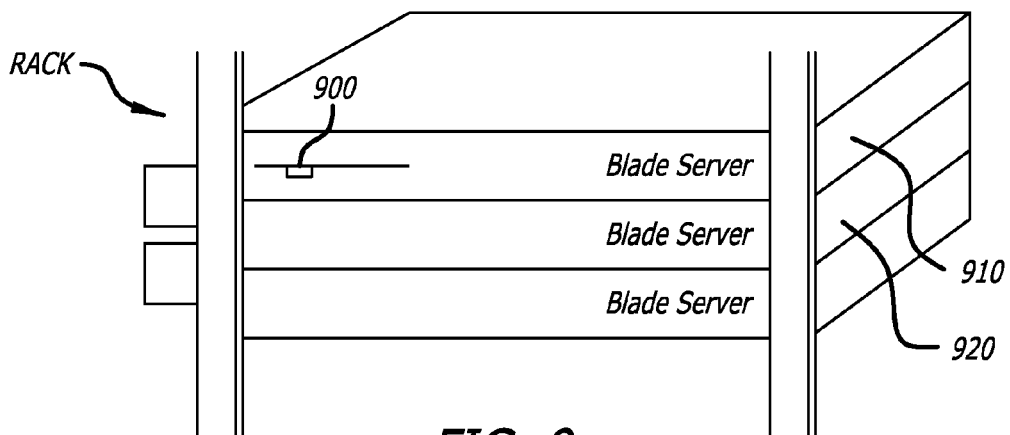
FIG. 9 is an exemplary block diagram of an integrated circuit device with power management monitoring implemented within a blade server that is in communication with other blade servers.

Referring to FIG. 9, an exemplary block diagram of the electronic device implemented with an integrated circuit device 900 implemented with a blade server 910 for activity monitoring is shown. Herein, packaged integrated circuit device 900 is adapted as a controller to monitor and limit frequency and voltage levels for one or more different blade servers 920 other than blade server 910. Hence, controller 900 performs the above-described operations of the PCU implemented in accordance with the integrated circuit (die) architecture shown in FIG. 4A.

Figure 10:
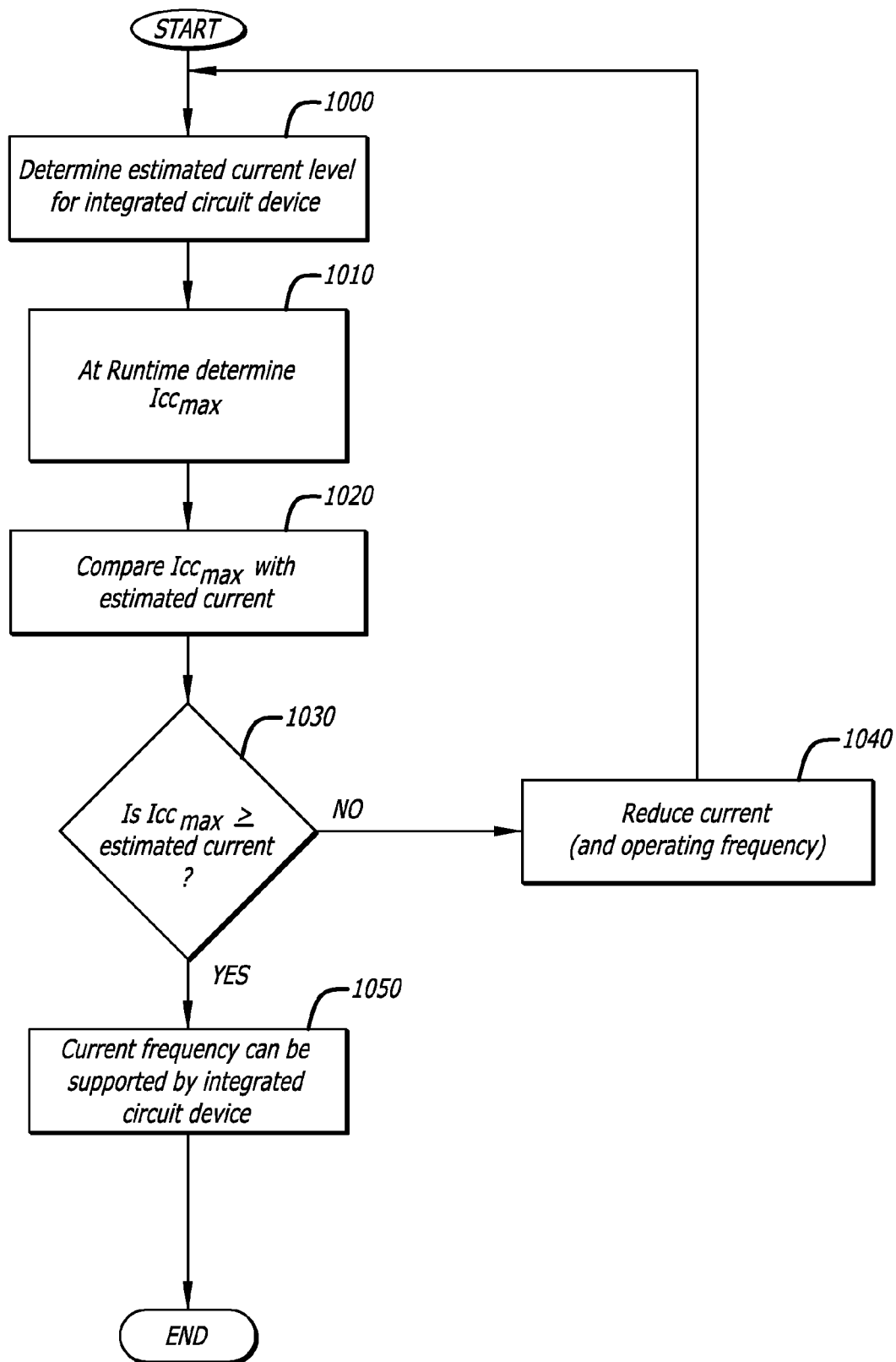
FIG. 10 is an exemplary flowchart of the operations conducted by the integrated circuit device for dynamic monitoring and application of a maximum current ($Icc_{max}$) power management parameter.

Referring now to FIG. 10, an exemplary flowchart of the operations by firmware within an integrated circuit device for dynamically monitoring and adjusting power management parameters for power conservation is shown. First, during run-time, firmware determines an estimated current level based on a plurality of deterministic parameters (block 1000). For instance, as an illustrative embodiment of the invention, the estimated current level may be computed using voltage, frequency, temperature, power virus and number of cores. Of course, it is contemplated that the estimated current level may be determined by logic other than firmware and/or a different estimation scheme may be used that includes additional parameters and/or exclude some of the listed parameters. Regardless, the estimated current level for the integrated circuit device may be calculated periodically, randomly or in response to a triggering event during run time.

During run time of the integrated circuit device, perhaps in response to a change in condition of the integrated circuit device 400 of FIG. 4A or the electronic device 100 of FIG. 1, $Icc_{max}$ is obtained from a designated storage element such as a software accessible register (block 1010). This $Icc_{max}$ may vary depending on which power plane of the integrated circuit (or area on the substrate or circuit board). For instance, $Icc_{max}$ for the processor power plane may be obtained from PP0_CURRENT_CONFIG MSR while $Icc_{max}$ for the graphics power plane may be obtained from PP1_CURRENT_CONFIG MSR, where these MSRs may store different $Icc_{max}$ values. $Icc_{max}$ may be adjusted during run time by the electronic device and will be re-sampled and considered by the firmware.

Thereafter, the estimated current level is compared to $Icc_{max}$ (block 1020). Where $Icc_{max}$ is associated with amperage greater than the estimated current level, the current level can be supported by the integrated circuit (blocks 1030 and 1040). Thus, no current adjustment is needed at this time and the integrated circuit device can operate at its existing operating frequency. Otherwise, the current is reduced which effectively reduces the operating frequency of the integrated circuit (blocks 1030 and 1050).

Figure 11A:
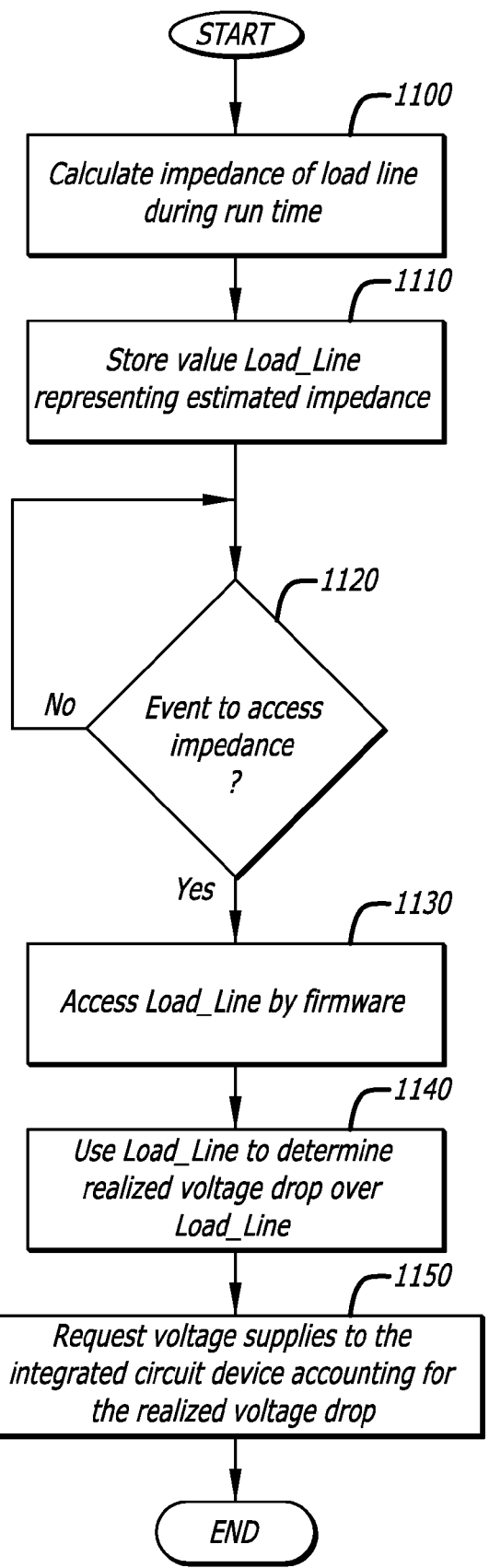
FIG. 11A is an exemplary flowchart of the operations conducted by the integrated circuit device for dynamic compensation of load line drop between a voltage regulator and the processor.

Referring to FIG. 11, an exemplary flowchart of the operations by firmware within an integrated circuit device for dynamically monitoring and adjusting power management parameters, such as a parameter corresponding to estimated impedance of the load line between the integrated circuit device and a power source (e.g., voltage regulator), is shown. This parameter, hereinafter referred to as "Load_Line," can be used to dynamically alter the supply voltage from the power source to the integrated circuit device in order to more accurately account for voltage loss realized over the load line. Such accuracy enables power conservation as the worst case load line impedance does not need to be used for computing the amount of voltage applied to the integrated circuit device from the power source.

First, according to one embodiment of the invention, an impedance of the load line is calculated (block 1100). For instance, as an illustrative embodiment of the invention, this impedance may be computed by circuitry within the electronic device (e.g., applying a constant current and measuring the voltage at each end of the load line). Once this impedance is determined, a value (Load_Line), which represents the estimated load line impedance, is stored in an accessible register (block 1110). For instance, Load_Line for the processor power plane may be stored within a particular storage element (e.g. bits [7:0] of PRIMARY_PLANE_LL-R_CONFIG_CONTROL MSR). As an example, Load_Line may represent an impedance ranging anywhere from 0-10 milliohms (mΩ). Likewise, Load_Line for the graphics power plane may be stored in another software-accessible storage element (e.g. bits [7:0] of SECONDARY_PLANE_LLR_CONFIG_CONTROL MSR) which represents an impedance ranging anywhere from 0-10 mΩ.

Next, as shown, in response to an event during run time (e.g., action, received signaling, elapsed time, etc.) which may occur periodically or randomly, firmware accesses Load_Line (blocks 1120 and 1130). Thereafter, as shown in block 1140, Load_Line is used to determine the amount of voltage drop caused by the load line between the integrated circuit device (e.g., processor 400 of FIG. 4A) and its power source. As a result, firmware uses this information, in combination with the known current supplied to the processor, to request additional voltage from the power source that matches the voltage drop along the load line (block 1150). This avoids usage of worst case voltage losses which normally causes the delivery of higher voltage to the processor than needed.

In general terms, the processor reads load line impedance (Load_Line) and using Load_Line to calculate a voltage drop over the load line. Thereafter, the amount of requested voltage compensates for the calculated voltage drop.

Figure 11B:
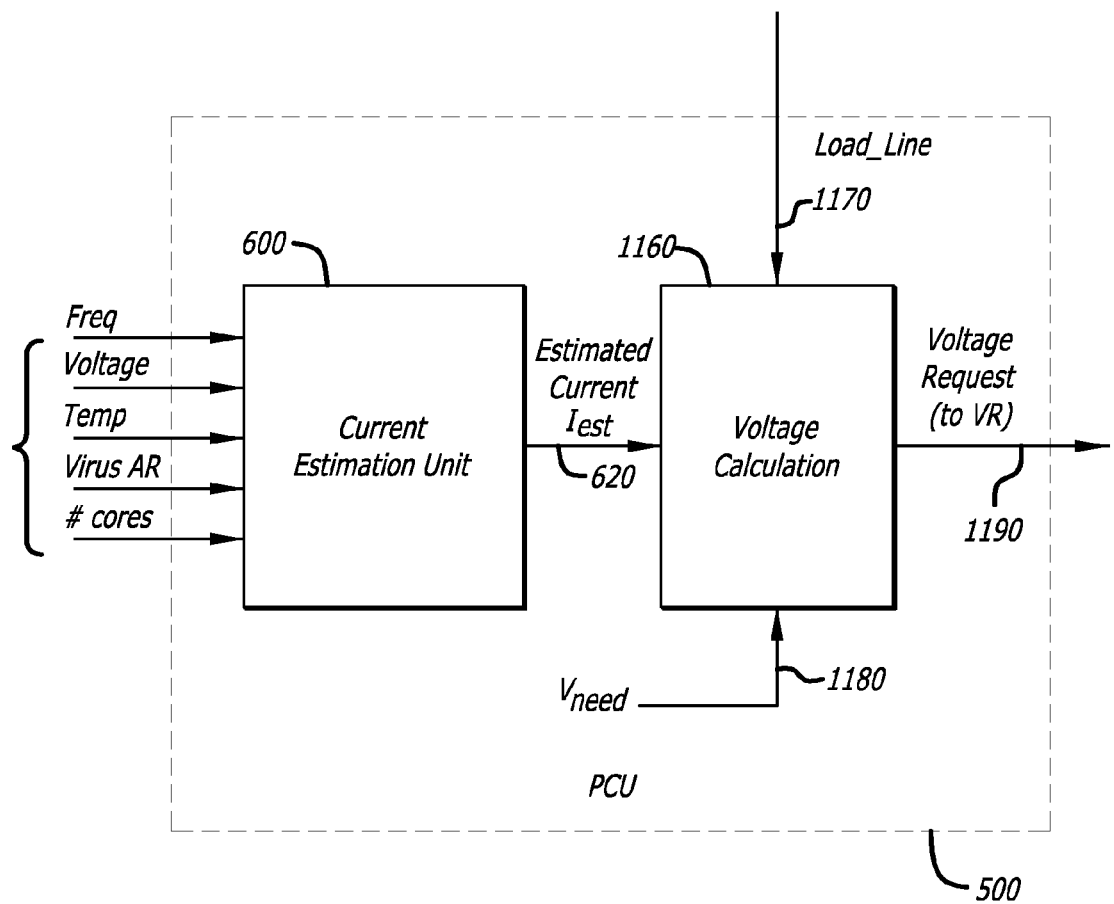
FIG. 11B is an exemplary embodiment of adjustment of a voltage request during run time in accordance with an embodiment of the invention.

As shown in FIG. 11B, current estimation unit 600 of PCU 500 actively or passively monitors parameters 610 that are used to estimate an amount of current utilized by the integrated circuit device. For example, according to one embodiment of the invention, these values (measured by sensors or contained within MSRs) are input into current estimation unit 600.

According to this embodiment of the invention, as illustrated in FIG. 11B, current estimation unit 600 performs an arithmetic operation on parameters 610 in order to produce estimated current ($I_{est}$) 620 as previously described. Estimated current ($I_{est}$) 620 is input into a voltage calculation circuit 1160, which takes the voltage needed by the processor ($V_{need}$) 1180, estimated current ($I_{est}$) 620 and Load_Line 1170 from the electronic device to produce a voltage request 1190. Herein, the load line impedance is read and readjusting voltage request at runtime.

Figure 12:
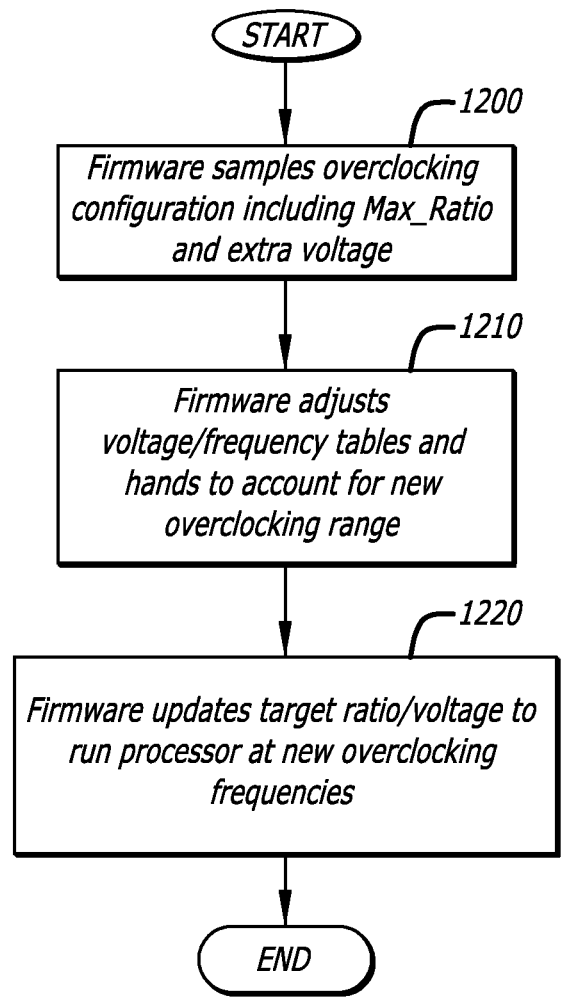
FIG. 12 is an exemplary flowchart of the operations conducted by the integrated circuit device for dynamic monitoring and application of a maximum ratio to control overclocking of the processor.

Referring now to FIG. 12, an exemplary flowchart of the operations by firmware within an integrated circuit device for dynamically monitoring and adjusting power management parameters, namely the maximum ratio that is relied upon for setting the operating frequency of the integrated circuit device, is shown. In particular, the maximum ratio is used to set an overclocking condition.

In general, for run-time overclocking, the firmware (e.g., P-code) samples overclocking configuration including maximum ratios and extra voltage (block 1200). Thereafter, the firmware adjusts voltage/frequency tables and limits to account for a new overclocking range (block 1210). The firmware then updates the target ratio/voltage to run processor at new overclocking frequencies (block 1220).

More specifically, when permitted, firmware samples the Max_Ratio 490 of FIG. 4D and uses this ratio as a multiplier for a reference clock frequency. This causes overclocking by increasing the operating frequency for at least one of processor cores 410₁-410ₙ beyond the established TDP frequency and beyond a maximum turbo frequency spec'ed by the manufacturer of the integrated circuit device. Furthermore, firmware samples the OVER_CLOCKING_EXTRA_VOLTAGE bits 495 of FIG. 4D and updates its voltage and frequency tables to account for the increased voltage and frequency.

While the invention has been described in terms of several embodiments, the invention should not limited to only those embodiments described, but can be practiced with modification and alteration within the spirit and scope of the appended claims. The description is thus to be regarded as illustrative instead of limiting.

What is claimed is:

1. An integrated circuit device comprising:
   at least one compute engine;
   a machine specific register to store a value representing a load line impedance between the at least one compute engine and a power source, wherein the value representing the load line impedance is to be dynamically changed due to operational variations;
   and a control unit coupled to the at least one compute engine, the control unit comprising:
      a current estimation circuit to determine an estimated current utilized by the at least one compute engine by analyzing an operating frequency of the at least one compute engine, a voltage supplied to the at least one compute engine, a temperature of the at least one compute engine, and a number of cores utilized by the at least one compute engine;
      and a voltage calculation circuit to dynamically calculate a voltage based on the load line impedance and the estimated current;
      the voltage calculation circuit further to produce a request for power to the power source when a higher voltage than the calculated voltage is consumable by the integrated circuit device.

2. The integrated circuit device of claim 1, wherein the control unit further to effectively reduce an operating frequency of the integrated circuit device when the estimated current exceeds a permitted current level.

3. The integrated circuit device of claim 2, wherein the at least one compute engine is either at least one processor core or a graphics logic.

4. The integrated circuit device of claim 3, wherein the control unit of the integrated circuit device is located on a first power plane and the value representing a load line impedance between the at least one compute engine and a power source is directed to the current level permitted for a second power plane of the integrated circuit device, the second power plane including the at least one processor core.

5. The integrated circuit device of claim 2, wherein the current estimation circuit is to determine the estimated current by analyzing at least four of: an operating frequency of the at least one computing engine, a voltage supplied to the at least one computing engine, a temperature of the at least one computing engine, a power virus, and a number of cores utilized by the integrated circuit device.

6. The integrated circuit device of claim 2, further comprising:
   a machine specific register to store a current level permitted value.

7. The integrated circuit device of claim 1 further comprising a clock source to provide a reference clock.

8. The integrated circuit device of claim 7, wherein the machine specific register to include a value that represents a multiplier applied to the reference clock for overclocking the at least one compute engine.

9. The integrated circuit device of claim 8, wherein the machine specific register further to include a value that represents an additional voltage to be supplied to the at least one compute engine during overclocking.

10. The integrated circuit device of claim 1, further comprising:
    the control unit to dynamically control an energy-efficient operating setting of at least one power management parameter for the integrated circuit device after execution of Basic Input/Output System (BIOS) has completed.

11. An electronic device comprising:
    a housing;
    and an integrated circuit device implemented with the housing, the integrated circuit device comprising:
       at least one compute engine to execute operating system software to control operations of the electronic device, a machine specific register to store a value representing a current level permitted for the integrated circuit device, a current estimation circuit to determine an estimated current received by the integrated circuit device by analyzing at least four of: an operating frequency of the at least one compute engine, a voltage supplied to the at least one computing engine, a temperature of the at least one computing engine, a power virus, and a number of cores utilized by the integrated circuit device;
       and a control unit coupled to the at least one compute engine, the control unit to dynamically, reduce an operating frequency of the integrated circuit device when the estimated current exceeds the current level permitted;
       wherein the control unit is to dynamically calculate a voltage based on the load line impedance and the estimated current;
       wherein the control unit is to produce a request for power to the power source when a higher voltage than the calculated voltage is consumable by the at least one compute engine.

12. The electronic device of claim 11, wherein the run time is after Basic Input/Output System (BIOS) software has completed loading and is to be executed by the at least one compute engine.

13. A method comprising:
    running an operating system to control operations of an electronic device implemented with an integrated circuit device;
    dynamically controlling a machine specific register including a value representing a load line impedance between the integrated circuit device and a power source during run time of the operating system, wherein the load line impedance is to change due to operational variations of the electronic device;
    determining an estimated current for at least one compute engine of the integrated circuit device by analyzing at least four of: an operating frequency of the integrated circuit device, a voltage supplied to the integrated circuit device, a temperature of the integrated circuit device, a power virus, and a number of cores utilized by the integrated circuit device;
    using the estimated current and the load line impedance to calculate an estimated voltage;

and requesting power from a power source taking into account a difference between the estimated voltage and a voltage consumable by the integrated circuit device.

14. The method of claim 13, wherein the machine specific register further includes a value that represents a current level permitted for a first portion of the integrated circuit device.

15. The method of claim 14 further comprising:
reducing an operating frequency of the integrated circuit device when the estimated current for the first portion exceeds the current level permitted.

16. The method of claim 13, wherein the machine specific register further includes a value that represents a multiplier applied to a reference clock for overclocking of at least one compute engine of the integrated circuit device.

17. The method of claim 16, wherein the machine specific register further includes a value that represents an additional voltage to be supplied to the at least one compute engine during overclocking.

* * * * *